United States Patent
Kwon et al.

(10) Patent No.: US 8,242,721 B2
(45) Date of Patent: Aug. 14, 2012

(54) POSITION-SENSORLESS CONTROL SYSTEM AND METHOD OF OPERATION FOR A SYNCHRONOUS MOTOR

(75) Inventors: Jeong Hyeck Kwon, West Hartford, CT (US); Edward A. Clark, East Longmeadow, MA (US); Giridhari L. Agrawal, Simsbury, CT (US)

(73) Assignee: R&D Dynamics Corporation, Bloomfield, CT (US)

( * ) Notice: Subject to any disclaimer, the term of this patent is extended or adjusted under 35 U.S.C. 154(b) by 433 days.

(21) Appl. No.: 12/609,665

(22) Filed: Oct. 30, 2009

(65) Prior Publication Data

US 2010/0109584 A1    May 6, 2010

Related U.S. Application Data

(60) Provisional application No. 61/110,285, filed on Oct. 31, 2008.

(51) Int. Cl.
*H02P 21/00* (2006.01)
(52) U.S. Cl. .......... 318/400.02; 318/400.32; 318/400.09
(58) Field of Classification Search ............. 318/400.02, 318/400.32, 400.09, 807, 439, 799, 610, 318/700, 778
See application file for complete search history.

(56) References Cited

U.S. PATENT DOCUMENTS

| | | | |
|---|---|---|---|
| 6,492,788 B1 | 12/2002 | Agirman et al. | |
| 6,841,969 B1 * | 1/2005 | Schulz et al. | 318/807 |
| 6,894,454 B2 | 5/2005 | Patel et al. | |
| 7,560,894 B2 | 7/2009 | Salomäki et al. | |
| 2007/0132415 A1 | 6/2007 | Patel et al. | |
| 2007/0144120 A1* | 6/2007 | Kawasaki et al. | 55/385.3 |
| 2007/0257626 A1 | 11/2007 | Lee et al. | |
| 2008/0079385 A1 | 4/2008 | Hashimoto et al. | |

* cited by examiner

*Primary Examiner* — Karen Masih
(74) *Attorney, Agent, or Firm* — McCormick, Paulding & Huber LLP

(57) ABSTRACT

This invention provides an advanced position and velocity estimation scheme used in a position-sensorless control system for synchronous operation of an electric motor. The system includes an electric motor having a stator and a rotor; an inverter for powering the electric motor; and a controller for controlling the inverter. The controller utilizes a control system comprising a rotor angle and angular velocity estimation block; an estimated angle error detector block; a field-weakening block; and a torque-to-current converter block, all of which operate to generate control commands for operation of the motor.

18 Claims, 4 Drawing Sheets

POSITION-SENSORLESS CONTROL SYSTEM AND METHOD OF OPERATION FOR A SYNCHRONOUS MOTOR

CROSS-REFERENCE TO RELATED APPLICATION

This application claims the benefit of U.S. Provisional Application No. 61/110,285 filed Oct. 31, 2008, which is incorporated herein by reference.

TECHNICAL FIELD OF THE INVENTION

The present invention generally relates to the control of synchronous motors. More specifically, the present invention relates to a system and method for position-sensorless control of a synchronous electric motor using position and velocity estimation during motor operation.

BACKGROUND OF THE INVENTION

For high-speed synchronous motors, many types of motor control technologies have been adopted. Vector control is an accurate method of synchronous motor operation. Such a control system, however, is computationally intensive. A vector control method typically maps three-phase motor voltages and currents into a two-axis system. To accomplish this mapping, the vector control system requires precise rotor information, for example, rotor angular position and speed. Traditionally, feedback devices, such as resolvers, encoders or Hall Effect sensors, have been used to provide motor speed and rotor position information to the motor controller for motor control.

Recently, many types of turbo machinery have adapted high-speed synchronous motors as a power source. These types of machines may operate at rotational speeds of 150 krpm and beyond. It is very difficult to find feedback devices or sensors for such high operating speeds. Sensors that currently exist for such high speed turbo machines tend to be expensive and have low reliability. In addition, existing position sensors often limit system configuration options. These factors become prohibitive in high volume applications, such as for control systems used in industrial turbo-blowers and turbo-compressors.

If position sensors could be eliminated from a control system for a high-speed turbo machinery synchronous motor without affecting operation and efficiency of the motor and the turbo machine in which it is used, manufacturing costs could be significantly reduced while the reliability of the motor could be improved. Position-sensorless control can obtain rotor information from the electromagnetic characteristics of the synchronous motor and thus eliminate the need for a feedback sensor. Various position-sensorless vector control schemes already exist which may accomplish the task. These can be acquired from various vendors in application notes or through other means. However, existing methods are limited in various abilities.

For example, some common limitations on existing position-sensorless control schemes include: some control methods are not able to maintain control at extremely high speeds; and some control methods are limited in responsiveness to changes in load, torque and commanded speed. In addition, some controller configurations are limited in power and thus are not useful in certain applications like high-speed turbo machinery. Moreover, components and methods that are successful in lower power applications are often not relevant to all varieties of synchronous motors, especially high speed motors. For these reasons, an improved control method, specifically for use in turbo-machinery operating at high speeds, is necessary.

The proposed position-sensorless control system and method of operation for a synchronous motor in accordance with the present invention avoids the drawbacks common to existing control systems and position-sensorless control systems, such as those discussed above, by using position and velocity estimation. The proposed position-sensorless control system can be used in turbo machinery operating at extremely high speeds without affecting the operation and efficiency of the synchronous motor. The present position-sensorless control system can accommodate such high speeds while also having the ability to respond to changes in load, torque, and commanded speed, all while improving system reliability.

SUMMARY OF THE INVENTION

The present invention is directed to a method and apparatus for a sensorless control system used in high-speed synchronous motors, including synchronous motors especially used in high-speed turbo machinery. The sensorless motor control system of the present invention includes an angular position estimation method and an angular velocity estimation method.

In one aspect of the present invention, a control system for an electric motor including a stator and a rotor comprises an inverter for providing power to the motor, and a controller for controlling the inverter. The inverter is controlled by the control system of the present invention via transmission of control commands for operation of the motor. The controller comprises a sensorless block, an estimated angle error detector block, a field-weakening block, and a torque-to-current converter block. The sensorless block estimates the angular position and velocity of the motor rotor and generates an estimated rotor angular position feedback signal and an estimated rotor angular velocity feedback signal. The estimated angle error detector block detects the difference between the estimated rotor angular position and a real rotor angular position, wherein the detected angular position difference is used by the sensorless block to estimate the estimated rotor angular position. The field-weakening block uses the estimated rotor angular velocity feedback signal from the sensorless block to command direct axis current and generate a torque feedback signal. The torque-to-current converter block uses the torque feedback signal generated by the field-weakening block to derive a torque current component for the motor control command. The estimated rotor angular position feedback signal is also used to generate the motor control command.

The control system of the present invention may be used in a power train for a blower/compressor system. The power train comprises an electric motor functionally coupled to the impeller of the blower/compressor system, an inverter for providing power to the motor, and a controller for controlling the inverter. The controller comprises an estimated angle error detector block and a sensorless block. The sensorless block estimates the angular position and velocity of the motor rotor. The estimated angle error detector block detects the difference between the estimated rotor angular position and the real rotor angular position, and the controller generates a command transmitted to the inverter for operation of the motor based, in part, on the estimated angular position and velocity and the detected angular position difference. The controller can also include a field-weakening block and a torque-to-current converter block that operate to generate control commands for operation of the motor.

In another aspect, the present invention is directed to a method for controlling an electric motor including a stator and a rotor. The method comprises the steps of estimating the angular position of the motor rotor and detecting the difference between the estimated rotor angular position and the real rotor angular position. A sensorless block is provided to estimate the rotor angular position as well as the rotor angular velocity. An estimated angle error detector block is provided to detect the difference between the estimated rotor angular position and the real rotor angular position. The detected difference of rotor angular position is used, in part, to generate a command transmitted to the inverter for operation of the motor. The detector block can be in a simplified form.

In additional aspects of the method for controlling the motor, the method comprises the steps of generating an estimated rotor angular velocity feedback signal; transmitting said estimated rotor angular velocity feedback signal to a field-weakening block of the controller; using the estimated rotor angular feedback signal to control direct axis current and to generate a torque feedback signal; transmitting said torque feedback signal to a torque-to-current converter block of the controller; and using the torque feedback signal to derive a torque current command for motor operation control. Further, the method comprises the steps of generating an estimated rotor angular position feedback signal; and using the estimated rotor angular position feedback signal to generate a command for motor operation control.

The sensorless motor control system of the present invention includes advancements in rotor angular position and angular velocity estimation methods, which account for differences between the direct and quadrature axes of a motor.

These and other features of the present invention are described with reference to the drawings of preferred embodiments of a system and method for implementing position-sensorless control of a synchronous motor. The illustrated embodiments of the system in accordance with the present invention are intended to illustrate, but not limit, the invention.

DESCRIPTION OF PREFERRED EMBODIMENTS OF THE INVENTION

Figure 2:
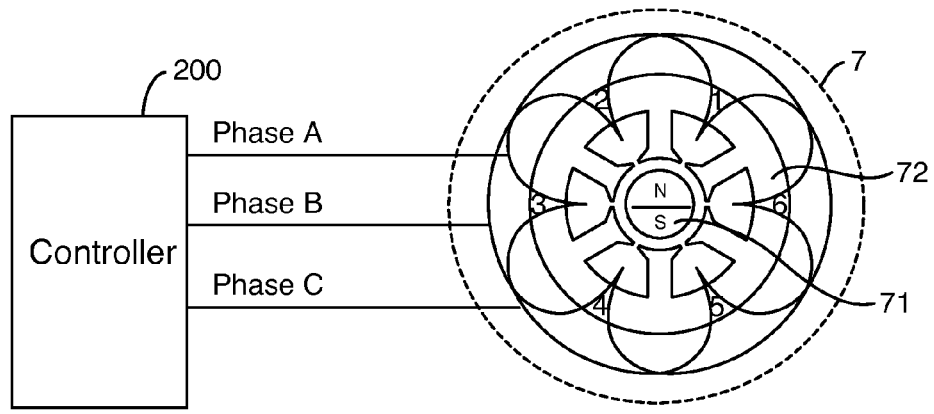
FIG. 2 is a block diagram showing a preferred embodiment for position-sensorless control in accordance with the present invention, wherein a controller is connected to a motor for operation thereof.
Figure 7:
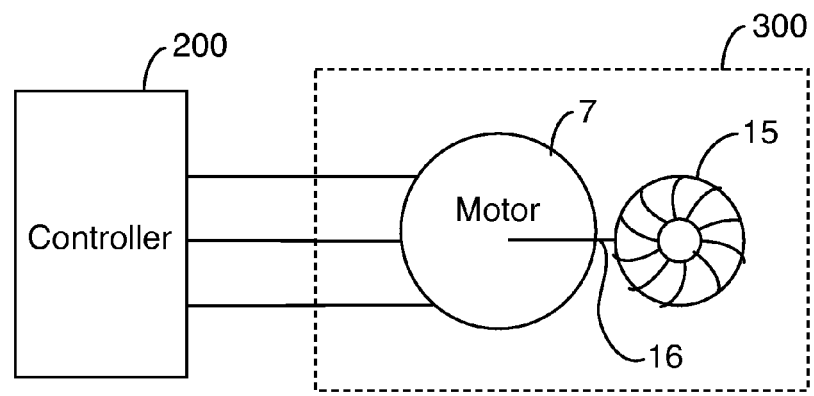
FIG. 7 is a block diagram representation showing another preferred embodiment for position-sensorless control in accordance with the present invention, wherein a controller is connected to a motor serving as the power train for a blower or compressor.

The present invention is generally directed to a control system for sensorless control of high-speed motors, including synchronous electric motors especially used in high-speed turbo machinery, such as turbo blowers and turbo compressors. Preferably, the control system is used with synchronous electric motors, such as AC synchronous motors, interior permanent magnetic motors, surface permanent magnetic motors, and the like. FIG. 2 illustrates an embodiment for position-sensorless control in accordance with the present invention, wherein a controller is connected to a motor for operation thereof. FIG. 7 illustrates an alternate embodiment for position-sensorless control in accordance with the present invention, wherein a controller is connected to a motor serving as the power train for a blower or compressor.

Figure 1:
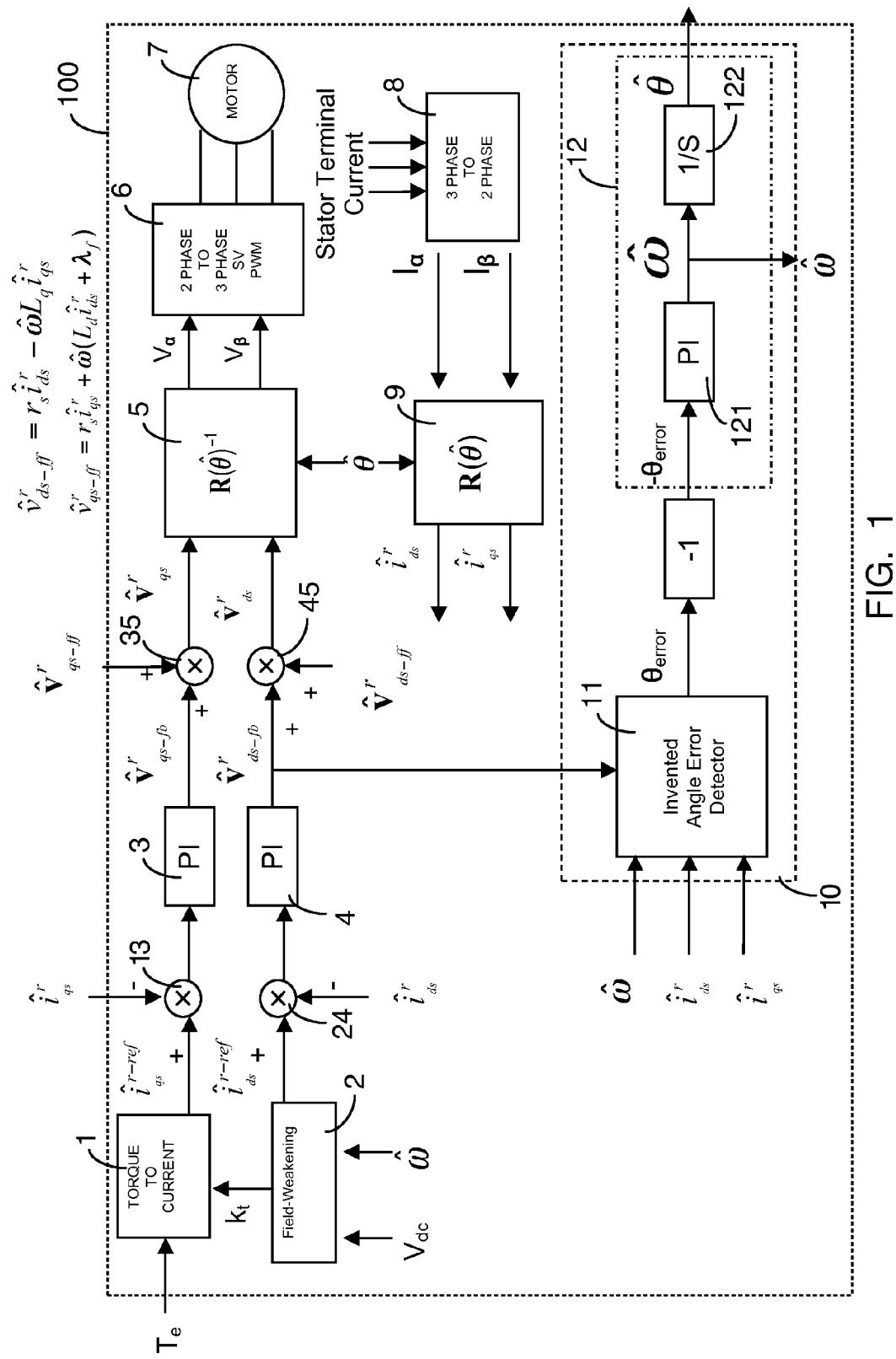
FIG. 1 is a diagram generally representing the overall structure of a system for implementing a position-sensorless controlling method of a synchronous motor in accordance with the present invention.

FIG. 1 provides a block diagram of a control system 100 configured as a preferred embodiment of the present invention. The sequence of the block diagram represents the execution of software in a controller, microprocessor, or similar processing device to control a motor 7. In preferred embodiments of the present invention, the control system 100 is associated with the motor 7 and used within a turbo blower or turbo compressor controller that controls the motor 7, but any other motor control applications are considered within the scope of the present invention. The electric motor 7 may comprise motor technologies such as AC synchronous motors, interior permanent magnetic motors, and surface permanent magnetic motors, but is not limited to such technology.

The control system 100 is preferably a phase locked loop (PLL) controller whereby the operation of the motor 7 is automatically adjusted and controlled without the use of feedback devices or sensors. The input to the control system 100 is a torque command $T_e$ generated by the blower or compressor controller for desired motor operation. The torque command $T_e$ is processed by a Torque-to-Current Converter Block 1, which generates a torque current command $\hat{i}_{qs}^{r\text{-}ref}$ to derive the desired electromagnetic torque in and for the motor 7. As described below and shown in FIG. 1, the torque current command $\hat{i}_{qs}^{r\text{-}ref}$ is transmitted through the control system 100 to a voltage source inverter 6 for operation of the motor 7.

As shown in FIG. 1, the control system 100 of the present invention accounts for velocity, current, voltage and other operational values for motor operation with reference to a direct (d) axis and a quadrature (q) axis. For rotating frames— see, e.g., FIG. 3—the direct (d) axis is defined as that component that is in line with the field poles, while the quadrature (q) axis is defined as that component in quadrature with (i.e., at 90 degrees to) the axis of the field poles.

A field-weakening stator current command $\hat{i}_{ds}^{r\text{-}ref}$ is generated at a Field-Weakening Block 2 based on feedback regarding measured DC link voltage $V_{dc}$ and rotor angular velocity $\omega_r$. The field-weakening stator current command $\hat{i}_{ds}^{r\text{-}ref}$ is used to control direct axis (d-axis) current, as discussed below. The Field-Weakening Block 2 also generates a torque feedback signal, namely, a torque-to-current constant $k_t$, which is used in the Torque-to-Current Converter Block 1 to derive the proper system command for motor control and operation.

Summing junction 13 subtracts a calculated q-axis stator torque current $\hat{i}_{qs}^r$ from the q-axis stator torque current command $\hat{i}_{qs}^{r\text{-}ref}$ to generate a q-axis error value. Summing junction 24 subtracts a calculated d-axis stator field current $\hat{i}_{ds}^{r}$ from the d-axis stator field current command $\hat{i}_{ds}^{r\text{-}ref}$ to generate a d-axis error value. The q-axis error value generated by summing junction 13 is processed by Proportional Integral (PI) Control Block 3 to generate a q-axis feedback control output $\hat{v}_{qs\text{-}fb}^{r}$. The d-axis error value generated by summing junction 24 is processed by Proportional Integral (PI) Control Block 4 to generate a d-axis feedback control output $\hat{v}_{ds\text{-}fb}^{r}$.

The q-axis feedback control $\hat{v}_{qs\text{-}fb}^{r}$ is summed at summing junction 35 with a q-axis feed forward stator resistance voltage drop decoupling term $\hat{v}_{qs\text{-}ff}^{r}$ (i.e., stator resistance voltage drop $(r_s\hat{i}_{qs}^{r})$ plus speed voltage $(\hat{\omega}L_d\hat{i}_{ds}^{r}+\hat{\omega}\lambda_f)$) to produce a q-axis voltage command $\hat{v}_{qs}^{r}$. The d-axis feedback control output $\hat{v}_{ds\text{-}fb}^{r}$ is summed at summing junction 45 with a d-axis feed forward stator resistance voltage drop decoupling term (i.e., stator resistance voltage drop $(r_s\hat{i}_{ds}^{r})$ plus speed voltage $(\hat{\omega}L_q\hat{i}_{qs}^{r})$) to produce a d-axis voltage command $v_{ds}^{r}$. More particularly, the q-axis and d-axis voltage commands, $\hat{v}_{qs}^{r}$ and $v_{ds}^{r}$, are stator flux reference frame voltage commands.

The q-axis and d-axis stator flux reference frame voltage commands, $\hat{v}_{qs}^{r}$ and $\hat{v}_{ds}^{r}$, respectively, are processed at a Rotating-to-Stationary Frame Transformation Block 5 using an estimated angular position value $\hat{\theta}$ to convert the reference frame voltage commands $\hat{v}_{qs}^{r}$ and $\hat{v}_{ds}^{r}$ to the stationary frame voltage commands $v_\alpha$ and $v_\beta$ that generate the actual phase voltage commands applied to the electric motor 7 by the inverter 6.

The voltage source inverter 6 processes the final voltage commands $v_\alpha$ and $v_\beta$ using a two-phase to three-phase transformation to generate the actual three-phase voltages to be applied to the motor 7.

The actual three-phase stator terminal currents are measured and processed by a three-phase to two-phase Transformation Block 8. The outputs of the Transformation Block 8 are stationary frame currents $I_\alpha$ and $I_\beta$, which are supplied to a Stationary-to-Rotating Frame Transformation Block 9.

The Stationary-to-Rotating Frame Transformation Block 9 uses the stationary frame currents $I_\alpha$ and $I_\beta$ and the estimated rotor angular position $\hat{\theta}$ to generate rotor flux reference frame feedback currents $\hat{i}_{ds}^{r}$ and $\hat{i}_{qs}^{r}$.

A Sensorless Block 10 of FIG. 1 represents a rotor angle and speed estimator. As used herein, "rotor angle" is interchangeable with "rotor position", while "rotor velocity" is interchangeable with "rotor speed". Thus, the Sensorless Block 10 represents an estimated angle error detecting method of the present invention whereby an estimated rotor angular position and an estimated rotor angular velocity are determined. Moreover, the Sensorless Block 10 also generates an estimated rotor angular velocity feedback signal to be provided to the Field-Weakening Block 2 and an estimated rotor angular position feedback signal that is utilized by the control system to generate control commands for operation of the motor.

The Sensorless Block 10 includes an Estimated Angle Error Detector Block 11 that uses the output voltage ($\hat{v}_{ds\text{-}fb}^{r}$) of PI Control Block 4, estimated rotor angular velocity $\hat{\omega}$, controller estimated d- and q-axis currents (or rotor flux reference frame feedback currents) $\hat{i}_{ds}^{r}$ and $\hat{i}_{qs}^{r}$, and motor parameters $r_s$ and $L_d$ to estimate an angle error $\theta_{error}$ connoting the difference between the estimated rotor angular position and the real rotor angular position.

Figure 4:
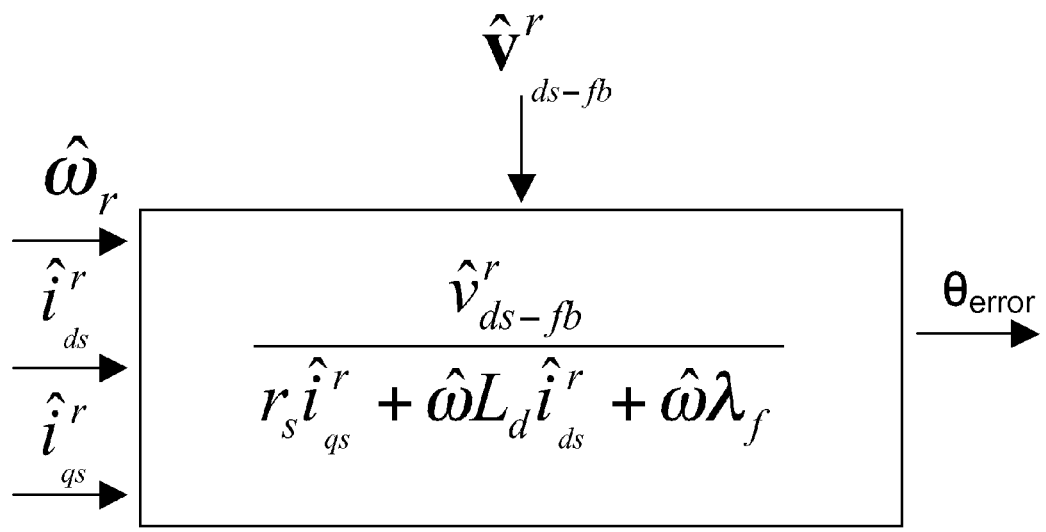
FIG. 4 is a block diagram representation of the computation of estimated angle error.
Figure 5:
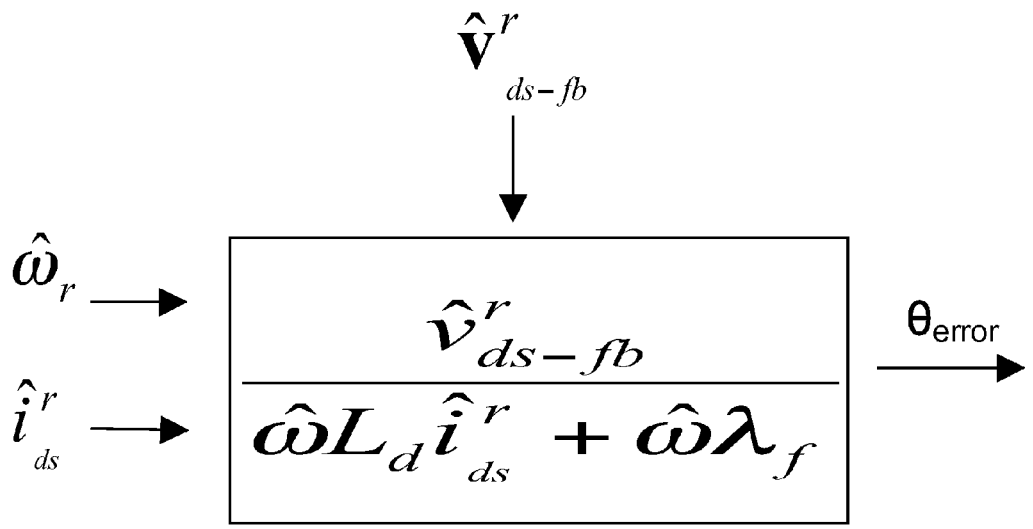
FIG. 5 is a block diagram representation of a simplified form of the computation of the estimated angle error.

As shown in FIG. 4, an advanced computation method of the Estimated Angle Error Detector Block 11 accounts for differences between d-axis and q-axis properties when detecting the angle error $\theta_{error}$. This advanced computation method makes the position-sensorless control methods of the present invention applicable to a wider range of motors than for prior art control systems. FIG. 5 illustrates a simplified form of the estimated angle error computation of FIG. 4 where the stator resistance voltage drop $(r_s\hat{i}_{qs}^{r})$ in the denominator of the computation can be neglected, as the value is insignificant in most cases.

As further shown in FIG. 1, the angle error $\theta_{error}$ estimated by Estimated Angle Error Detector Block 11 is multiplied by −1. This new signal $(-\theta_{error})$ is processed by Proportional Integral (PI) Control Block 121 to generate an estimated rotor angular velocity $\hat{\omega}$. Estimated rotor angular velocity $\hat{\omega}$ is processed by Integral Block 122 to generate an estimated rotor angular position $\hat{\theta}$. Both estimated values are re-cycled during operation of the motor for continued sensorless control thereof. In particular, the estimated rotor angular velocity $\hat{\omega}$ is an input to the Field-Weakening Block 2, as shown in FIG. 1. As further shown in FIG. 1, the estimated rotor angular position $\hat{\theta}$ serves as an input for both the Rotating-to-Stationary Frame Transformation Block 5 and the Stationary-to-Rotating Frame Transformation Block 9 for conversion of voltage and current between stationary and rotating frames for the vector control of the motor.

FIG. 2 illustrates a preferred embodiment for position-sensorless control in accordance with the present invention, wherein a controller 200 is connected to a motor 7 for operation thereof. Typically, the motor is a synchronous electric motor adapted for use with extremely high-speed turbo machinery, such as turbo blowers and turbo compressors. As shown, the motor 7 is a three-phase motor, which is more particularly a radial gap motor with a two-pole permanent magnet motor 71 internally positioned relative to a round, six-slot stator 72. Though a permanent magnet synchronous motor (PMSM) is illustrated, the position-sensorless control system of the present invention may be used with other motor types as well.

FIG. 7 illustrates another embodiment for position-sensorless control in accordance with the present invention, wherein the controller 200 is connected to a turbo machine 300. The illustrated turbo machine 300 generally comprises a motor 7 serving as the power train for a blower or compressor. Again, the motor is preferably a synchronous electric motor adapted for use with extremely high-speed turbo machinery. As shown, the motor 7 is a three-phase motor, and is generally operatively connected to an impeller 15 of the blower or compressor via a mechanical linkage 16.

1.1 Current Controller and Estimated Angle Error Detector

In a PMSM with which the control system 100 in accordance with the present invention can be used (FIG. 2), the voltage and flux equations in the rotational $d^r$-$q^r$ reference frame can be expressed as:

$$v_{ds}^{r} = r_s i_{ds}^{r} + \frac{d\lambda_{ds}^{r}}{dt} - \omega_r \lambda_{qs}^{r} \tag{1}$$

$$v_{qs}^{r} = r_s i_{qs}^{r} + \frac{d\lambda_{qs}^{r}}{dt} + \omega_r \lambda_{ds}^{r} \tag{2}$$

$$\lambda_{ds}^{r} = L_d i_{ds}^{r} + \lambda_f \tag{3}$$

$$\lambda_{qs}^{r} = L_q i_{qs}^{r} \tag{4}$$

where $v_{ds}^{r}$, $v_{qs}^{r}$ and $i_{ds}^{r}$, $i_{qs}^{r}$ are voltages and currents in the $d^r$- and $q^r$-axes, $r_s$ is the stator winding resistance, $L_d$ and $L_q$ are inductance in the $d^r$- and $q^r$-axes, $\lambda_{ds}^{r}$, $\lambda_{qs}^{r}$ are flux linkages in $d^r$- and $q^r$-axes, $\lambda_f$ is the main flux linkage of the permanent magnet, and $\omega_r$ is the angular velocity of rotor.

In the steady-state, $v_{ds}^r$, $v_{qs}^r$ can be written as:

$$v_{ds}^r = r_s i_{ds}^r - \omega_r L_q i_{qs}^r \quad (5)$$

$$v_{qs}^r = r_s i_{qs}^r + \omega_r (L_d i_{ds}^r + \lambda_f) \quad (6)$$

Figure 3:
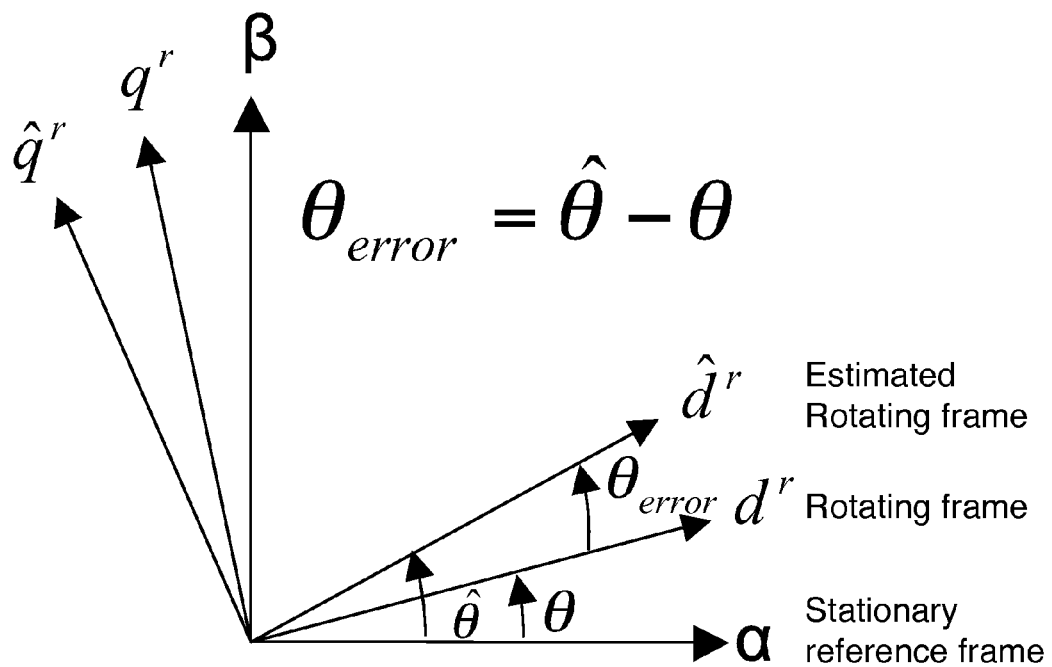
FIG. 3 is a vector diagram illustrating the phase relation between a rotor and a stator in the system of FIG. 1. The stationary reference frame represents the fixed stator position, actual rotor relative position is represented by vectors $d^r$ and $q^r$, and the controller-estimated rotor angle is represented by vectors $\hat{d}^r$ and $\hat{q}^r$.

If the estimated angle $\hat{\theta}$, differs from the real angle $\theta$, as shown in FIG. 3, the difference $\theta_{error}$, can be defined as:

$$\theta_{error} = \hat{\theta} - \theta \quad (7)$$

FIG. 3 illustrates the phase relation between the motor rotor 71 and the motor stator 72. The stationary reference frame axes $\alpha$ and $\beta$ represent the fixed stator position. As noted above, the d-axis is defined as that component that is in line with the field poles, while the q-axis is defined as that component in quadrature with (i.e., at 90 degrees to) the axis of the field poles. The actual rotor relative positions is represented by vectors $d^r$ and $q^r$, and the controller-estimated rotor angle is represented by vectors $\hat{d}^r$ and $\hat{q}^r$.

The voltage equation in estimated axes $\hat{d}^r$ and $\hat{q}^r$ can be represented as follows, $$\begin{bmatrix} \hat{v}_{ds}^r \\ \hat{v}_{qs}^r \end{bmatrix} = \begin{bmatrix} \cos\theta_{error} & \sin\theta_{error} \\ -\sin\theta_{error} & \cos\theta_{error} \end{bmatrix} \begin{bmatrix} v_{ds}^r \\ v_{qs}^r \end{bmatrix} \quad (8)$$

where $\hat{v}_{ds}^r$ and $\hat{v}_{qs}^r$ are voltages in the estimated axis, $\hat{d}^r$ and $\hat{q}^r$.

A steady-state $\hat{v}_{ds}^r$ and $\hat{v}_{qs}^r$ can be determined with Equations (5), (6) and (8).

$$\hat{v}_{ds}^r = \cos\theta_{error}(r_s i_{ds}^r - \omega_r L_q i_{qs}^r) + \sin\theta_{error}(r_s i_{qs}^r + \omega_r L_d i_{ds}^r + \omega_r \lambda_f) \quad (9)$$

$$\hat{v}_{qs}^r = \sin\theta_{error}(r_s i_{ds}^r - \omega_r L_q i_{qs}^r) + \cos\theta_{error}(r_s i_{qs}^r + \omega_r L_d i_{ds}^r + \omega_r \lambda_f) \quad (10)$$

FIG. 1 shows the overall control structure of the proposed sensorless algorithm. The d- and q-axis feed-forward stator resistance voltage drop decoupling terms, $\hat{v}_{ds-ff}^r$, $\hat{v}_{qs-ff}^r$, are defined as follows, $$\hat{v}_{ds-ff}^r = r_s \hat{i}_{ds}^r - \hat{\omega} L_q \hat{i}_{qs}^r \quad (11)$$

$$\hat{v}_{qs-ff}^r = r_s \hat{i}_{qs}^r + \hat{\omega}(L_d \hat{i}_{ds}^r + \lambda_f) \quad (12)$$

where $\hat{i}_{ds}^r$ and $\hat{i}_{qs}^r$ are the controller estimated d- and q-axis currents.

In steady state, $$\hat{v}_{ds}^r = \hat{v}_{ds-fb}^r + \hat{v}_{ds-ff}^r \quad (13)$$

$$\hat{v}_{ds-fb}^r = \hat{v}_{ds}^r - \hat{v}_{ds-ff}^r \quad (14)$$

If $\theta_{error}$ is small, i.e., $\theta_{error} \approx 0$, and $\omega_r \approx \hat{\omega}_r$, we can approximate, $$\cos\theta_{error} = 1, \sin\theta_{error} = \theta_{error} \quad (15)$$

$$\hat{v}_{ds-fb}^r \approx r_s(i_{ds}^r - \hat{i}_{ds}^r) - \omega_r L_q(i_{qs}^r - \hat{i}_{qs}^r) +$$
$$\theta_{error}(r_s i_{qs}^r + \omega_r L_d i_{ds}^r + \omega_r \lambda_f) \approx \theta_{error}(r_s i_{qs}^r + \omega_r L_d i_{ds}^r + \omega_r \lambda_f)$$

From Equation (15), the estimated error $\theta_{error}$, can be approximated with some additional assumptions.

$$\theta_{error} \approx \frac{\hat{v}_{ds-fb}^r}{r_s i_{qs}^r + \omega_r L_d i_{ds}^r + \omega_r \lambda_f} \quad (16)$$

In operation, the controller doesn't know the real d- and q-axis currents $i_{ds}^r$, $i_{qs}^r$, or real speed $\omega_r$, so the controller will use estimated currents $\hat{i}_{ds}^r$, $\hat{i}_{qs}^r$ and estimated speed $\hat{\omega}_r$ at an estimated angle error detector. FIG. 4 shows a block diagram of an Estimated Angle Error Detector Block in accordance with the present invention, whereby an advanced calculation of the estimated angle error is represented as follows, $$\theta_{error} \approx \frac{\hat{v}_{ds-fb}^r}{r_s \hat{i}_{qs}^r + \hat{\omega} L_d \hat{i}_{ds}^r + \hat{\omega} \lambda_f} \quad (17)$$

In most cases, the stator resistance voltage drop $(r_s \hat{i}_{qs}^r)$ is insignificant, $r_s \hat{i}_{qs}^r \ll (\omega_r L_d i_{ds}^r + \omega_r \lambda_f)$, so the error detection formula can be further simplified as shown in the following equation:

$$\theta_{error} \approx \frac{\hat{v}_{ds-fb}^r}{\hat{\omega} L_d \hat{i}_{ds}^r + \hat{\omega} \lambda_f} \quad (18)$$

This method is shown in the Estimated Angle Error Detector Block diagram of FIG. 5.

In certain cases, $\hat{i}_{ds}^r$ is very close to $\hat{e}_{ds}^{r-ref}$ can be used in the angle error equation as shown in Equation (19).

$$\theta_{error} \approx \frac{\hat{v}_{ds-fb}^r}{r_s \hat{i}_{qs}^r + \hat{\omega} L_d \hat{i}_{ds}^{r-ref} + \hat{\omega} \lambda_f} \quad (19)$$

This version of the Equation, of course, can be simplified as in the previous case.

$$\theta_{error} \approx \frac{\hat{v}_{ds-fb}^r}{\hat{\omega} L_d \hat{i}_{ds}^{r-ref} + \hat{\omega} \lambda_f} \quad (20)$$

1.2 Estimated Angle and Velocity

Figure 6:
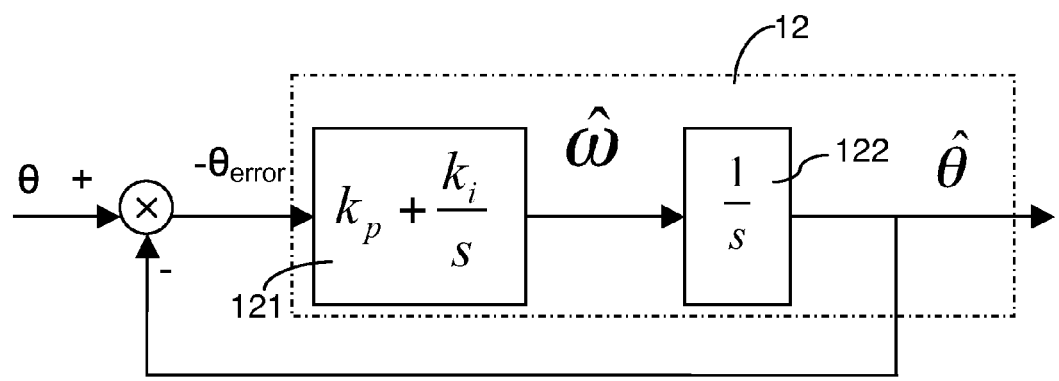
FIG. 6 is a block diagram representation of an alternate design of an angle and speed estimator for use in a position-sensorless control system in accordance with the present invention.

Sensorless Block 10 of FIG. 1 illustrates a block diagram of a preferable PLL controller design for estimating the angular position and the angular velocity of the motor rotor with which the controller is associated. From the detected angular difference $\theta_{error}$, it is possible to judge whether the estimated rotor is rotating forward or backward relative to the actual rotor operation. According to this rule, the PLL controller works quite simply as follows: if the estimated rotor is rotating forward, the PLL controller reduces the estimated angular velocity $\hat{\omega}$; if the estimated rotor is rotating backward, the PLL controller increases the angular velocity $\hat{\omega}$. As discussed above, the estimated angular velocity $\hat{\omega}$ is an input to the Field-Weakening Block 2, and thus is used, in part, to derive operative commands for the motor 7. As shown in FIGS. 1 and 6, the detected angular difference $\theta_{error}$ is also used to estimate the rotor angular position $\hat{\theta}$, which, in turn, serves as an input for deriving operative commands for the motor 7.

FIG. 6 shows a simplified block diagram of an alternate angle and speed estimation in accordance with the present invention that is similar to the estimation performed in the Sensorless Block 10, as shown in FIG. 1 and described above. The transfer function from real angle $\theta$, to the estimated rotor angle $\hat{\theta}$, is expressed in a second order system as follows:

$$G(s) = \frac{\theta_{hat}(s)}{\theta(s)} \approx \frac{k_p s + k_i}{s^2 + k_p s + k_i} \quad (21)$$

The value of gain $k_p$ and $k_i$ can be set properly according to an application using well known response characteristics of the second order system. An example of PI gains is shown in Equation (22).

$$k_p = \sqrt{2} \cdot \omega_c, k_i = \omega_c^2 \quad (22)$$

where $\omega_c$ is the transition frequency.

The estimation method carried out by the representation in FIG. 6 requires an input $\theta$ that represents the real rotor angular position. In some control schemes, this angle $\theta$ is provided by a sensor input. In a sensorless algorithm, as in the present invention, a calculated value of angle error $\theta_{error}$ is derived. The present invention improves on the angle error calculation approach to improve the position and speed estimation capabilities of the control system 100.

1.3 Field-Weakening

The field-weakening component $i_{ds}^r$ is generated by the Field-Weakening Block 2 using the measured DC link voltage $V_{dc}$ and the rotor angular velocity $\hat{\omega}_r$ inputs. The Field-Weakening Block 2 also generates a torque-to-current constant $k_t$, which is fed back to the Torque-to-Current Converter Block 1.

$$k_t = \frac{T_e}{i_{qs}^r} = \frac{3}{2} \frac{P}{2} [\lambda_f + (L_d - L_q) i_{ds}^r] \quad (23)$$

The input to the control system 100 is the torque command $T_e$ generated by a system controller. The torque command $T_e$ is processed by the Torque-to-Current Converter Block 1, which uses the torque feedback command generated by the Field-Weakening Block 2 to derive the torque current command $\hat{i}_{qs}^{r-ref}$, where:

$$\hat{i}_{qs}^{r-ref} = \frac{T_e}{k_t} \quad (24)$$

The torque current command, as processed further by the control system 100 as discussed above, is transmitted to the inverter 6 for operation of the motor 7 in accordance with desired calculations and adjustments.

1.4 Surface Permanent Magnetic Motor

The position-sensorless control system of the present invention is readily adaptable and relevant to a variety of synchronous electric motors. Surface permanent magnetic motors are synchronous motors that generally have the same d- and q-axis inductance.

$$L_s = L_d = L_q \quad (25)$$

where $L_s$ is the inductance of a surface permanent magnet motor. If $L_d = L_s$ and $L_q = L_s$, the sensorless algorithm described above can be applied to such a motor without affecting operation and efficiency.

The foregoing description of the present invention has been presented for the purpose of illustration and description. It is not intended to be exhaustive as to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular uses contemplated. It is intended that the scope of the present invention be defined by the claims appended hereto.

What is claimed is:

1. A position-sensorless control system for an electric motor having a stator and rotor comprising:
    an inverter for providing power to the electric motor; and
    a controller for controlling said inverter by transmission of control commands for operation of the motor, said controller comprising:
        a sensorless block for estimating an estimated rotor angular position and an estimated rotor angular velocity, wherein the sensorless block generates an estimated rotor angular position feedback signal and an estimated rotor angular velocity feedback signal;
        an estimated angle error detector block for detecting the difference between the estimated rotor angular position and a real rotor angular position, said detected difference being used by the sensorless block to estimate the estimated rotor angular position;
        a field-weakening block which receives the estimated rotor angular velocity feedback signal generated by the sensorless block to command direct axis current and generate a torque feedback signal; and
        a torque-to-current converter block which receives the torque feedback signal generated by the field-weakening block and derives a torque current component for the motor control command;
        wherein said estimated rotor angular position feedback signal is also used to generate the motor control command.

2. The position-sensorless control system as defined in claim 1, wherein the estimated angle error detector block detects the difference between the estimated rotor angular position and the real rotor angular position by accounting for differences between direct axis and quadrature axis properties of the motor.

3. The position-sensorless control system as defined in claim 1, wherein the torque feedback signal is a torque constant calculated by the field-weakening block; and
    wherein further, the torque-to-current converter block receives a command torque input and derives the torque current component for the motor control command based on the command torque input and the torque constant.

4. The position-sensorless control system as defined in claim 1, wherein the estimated rotor angular position is used for conversion of voltage and current between stationary and rotating frames for vector control of the motor.

5. The position-sensorless control system as defined in claim 1, wherein said electric motor is a synchronous motor.

6. The position-sensorless control system as defined in claim 1, wherein said electric motor is an interior permanent magnetic motor.

7. The position-sensorless control system as defined in claim 1, wherein said electric motor is a surface permanent magnetic motor.

8. A method for sensorless control an electric motor including a stator and a rotor, the method comprising the steps of:
    estimating an angular position of the motor rotor using a controller;
    detecting, using the controller, the difference between the estimated rotor angular position and a real rotor angular position;

generating an estimated rotor angular velocity feedback signal;

transmitting said estimated rotor angular velocity feedback signal to a field-weakening block of the controller;

using the estimated rotor angular velocity feedback signal to control direct axis current and to generate a torque feedback signal;

transmitting said torque feedback signal to a torque-to-current converter block of the controller; and using the torque feedback signal to derive a torque current command for motor operation control.

9. The method as defined in claim 8, further comprising providing an estimated angle error detector block for detecting the difference between the estimated rotor angular position and the real rotor angular position.

10. The method as defined in claim 9, wherein the difference between the estimated rotor angular position and the real rotor angular position is detected by accounting for differences between direct axis and quadrature axis properties of the motor.

11. The method as defined in claim 9, further comprising providing a sensorless block in operative communication with the estimated angle error detector block for estimating the angular position of the motor rotor.

12. The method of claim 11, wherein the sensorless block further estimates the angular velocity of the motor rotor.

13. The method as defined in claim 8, further comprising the steps of:

generating an estimated rotor angular position feedback signal; and using the estimated rotor angular position feedback signal to generate a command for motor operation control.

14. The method as defined in claim 8, further comprising operating the electric motor in a blower and compressor system.

15. A power train for a blower and compressor system including an impeller, said power train comprising:

an electric motor functionally coupled to the impeller of the blower and compressor system, said motor including a stator and a rotor;

an inverter for providing power to the electric motor; and a controller for controlling the inverter by transmission of control commands for operation of the motor, said controller comprising:

a sensorless block for estimating an estimated rotor angular position and an estimated rotor angular velocity, wherein said sensorless block generates an estimated rotor angular position feedback signal based on the estimated rotor angular position and an estimated rotor angular velocity feedback signal based on the estimated rotor angular velocity;

an estimated angle error detector block for detecting the difference between the estimated rotor angular position and a real rotor angular position;

a field-weakening block which receives the estimated rotor angular velocity feedback signal generated by the sensorless block to command direct axis current of the motor to generate a torque feedback signal; and a torque-to-current converter block which receives the torque feedback signal generated by the field-weakening block and derives a torque current component to transmit to the inverter for operation of the electric motor;

wherein said estimated rotor angular position feedback signal is also used to generate a control command for operation of the electric motor.

16. The power train as defined in claim 15, wherein said electric motor is a synchronous motor.

17. The power train as defined in claim 15, wherein said electric motor is an interior permanent magnetic motor.

18. The power train as defined in claim 15, wherein said electric motor is a surface permanent magnetic motor.

* * * * *